United States Patent [19]

Gilliam et al.

[11] Patent Number: 4,637,260

[45] Date of Patent: Jan. 20, 1987

[54] CAN END TESTER

[75] Inventors: Edward C. Gilliam, Midlothian; John M. Jackson, Glade Springs; Billy J. Lamie, Bristol, all of Va.

[73] Assignee: Reynolds Metals Company, Richmond, Va.

[21] Appl. No.: 895,589

[22] Filed: Aug. 14, 1986

Related U.S. Application Data

[63] Continuation of Ser. No. 808,552, Dec. 13, 1985, abandoned.

[51] Int. Cl.[4] .......... G01N 3/08

[52] U.S. Cl. .......... 73/826; 73/834

[58] Field of Search .......... 209/538, 540, 542, 546, 209/549, 551, 552, 599, 601, 604, 699, 700, 522, 523, 524, 530, 526, 928, 571, 597, 545; 73/828, 830, 862, 826, 827, 52, 865.9, 432.1, 834; 198/394, 395; 356/237, 240, 74, 28; 206/628, 604

[56] References Cited

U.S. PATENT DOCUMENTS

| | | | |
|---|---|---|---|
| 1,694,828 | 12/1928 | McClatchie | 209/604 |
| 2,321,331 | 6/1943 | Sweezey | 88/24 |
| 2,411,991 | 12/1946 | England et al. | 88/14 |
| 2,749,744 | 6/1956 | Doudera, Jr. et al. | 73/52 |
| 2,803,343 | 8/1957 | Dodge | 209/538 |
| 2,905,318 | 9/1959 | Schell | 209/524 |
| 3,261,465 | 7/1966 | Haller et al. | 209/597 |
| 3,415,350 | 12/1968 | Murphy | 198/33 |
| 3,559,471 | 2/1971 | Schaffer | 73/774 |
| 3,688,567 | 9/1972 | Thorwest et al. | 209/599 |
| 3,700,101 | 10/1972 | Ference et al. | 209/549 |
| 3,941,070 | 3/1976 | Kaminski | 113/7 A |
| 4,016,968 | 4/1977 | Stelter | 198/394 |
| 4,044,891 | 8/1977 | Pynsky | 209/597 |
| 4,107,541 | 8/1978 | Kirsch | 250/571 |
| 4,110,493 | 8/1978 | Loveless et al. | 427/233 |
| 4,315,688 | 2/1982 | Pryor | 356/73 |
| 4,390,098 | 6/1983 | Wilgus et al. | 209/928 |
| 4,495,797 | 1/1985 | Cassell, Jr. et al. | 73/40 |
| 4,497,409 | 2/1985 | Chong | 209/538 |
| 4,511,044 | 4/1985 | Connor et al. | 209/522 |
| 4,519,489 | 5/1985 | Dingus et al. | 73/863.41 |

FOREIGN PATENT DOCUMENTS

| | | | |
|---|---|---|---|
| 47902 | 2/1979 | Japan | 73/52 |

*Primary Examiner*—Michael J. Tokar
*Assistant Examiner*—Robert R. Raevis
*Attorney, Agent, or Firm*—Alan T. McDonald

[57] ABSTRACT

An apparatus is disclosed for testing easy-open can ends. The apparatus orients the ends, opens the ends, tests the ends to assure that opening has occurred and separates defective ends which have not successfully opened from acceptable ends.

20 Claims, 3 Drawing Figures

CAN END TESTER

This is a continuation of application Ser. No. 808,552 filed Dec. 13, 1985, now abandoned.

BACKGROUND OF THE INVENTION

Non-detachable easy-open metallic can ends are routinely employed in the packaging of beer and soft drinks in metallic cans. In order that quality be maintained, samples of ends are removed during production and tested to assure that these ends operate satisfactorily. Thus, for example, a sample about four ends for every package or "sleeve" of approximately 408 ends is tested.

Traditionally, the testing of these ends was accomplished manually. A quality control person would hold the end in one hand while lifting the tab with the other end, checking to see that the end opened satisfactorily. This test did not, however, always produce consistent results. Differences in the amount of force applied by different operators, or by even the same operator to different ends, uneven handling of the ends, such as pulling on the tab at an angle other than perpendicular to the tab, and other like differing handling characteristics could result in ends being considered unsatisfactorily opened when, in fact, the ends were fully satisfactory or in ends that were considered satisfactorily opening which, under normal circumstances, would not have opened properly. There is, therefore, a need for automating the testing of can ends so that each end is given equal treatment and consistent test results are obtained.

THE PRESENT INVENTION

By means of the present invention, the desired goal of consistent testing of non-detachable easy-open can ends has been obtained. The present invention comprises an apparatus which orients the ends, opens the ends, tests the ends for satisfactory opening and isolates unacceptable ends found during the testing operation. The apparatus is capable of testing ends without operator interference and with consistency.

BRIEF DESCRIPTION OF THE DRAWINGS

The can end tester of the present invention will be more fully described with reference to the drawings in which.

DETAILED DESCRIPTION OF THE PREFERRED EMBODIMENT

Figure 1:
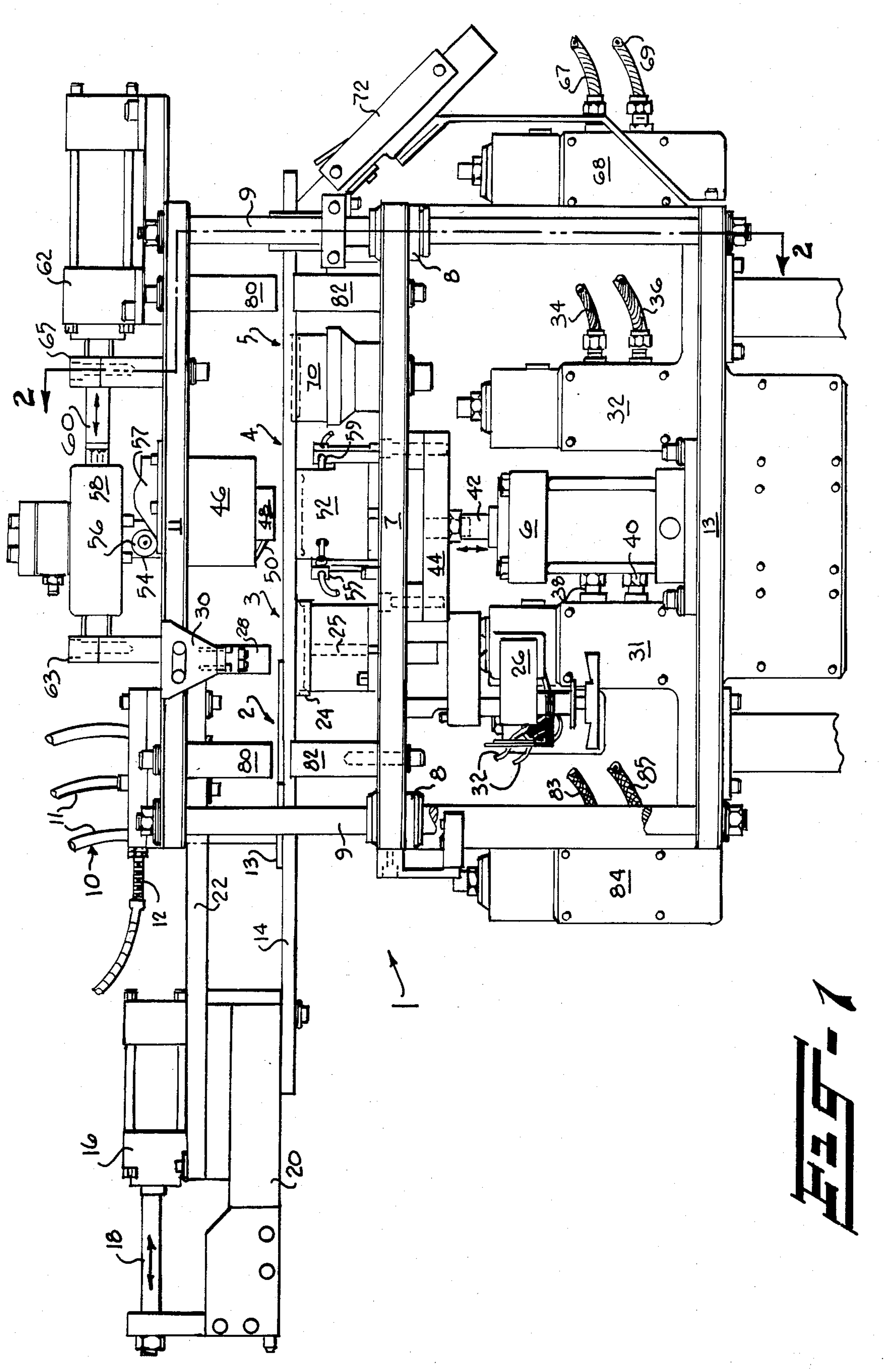
FIG. 1 is a side elevational view of the can end tester of the present invention, illustrating the various stations of the apparatus.

The can end tester 1 of the present invention is illustrated in side elevational view in FIG. 1. The tester 1 includes an entry station 2, an orienting station 3, an opening and testing station 4, a holding station 5 and an exit chute 72. The stations 2, 3, 4 and 5 comprise upper die portions which are fixedly mounted on an upper frame member 11 and lower die portions which are mounted for vertical oscillation on lower frame member 7. Lower frame member 7 oscillates vertically along side posts 9 through bushings 8. Vertical oscillation of lower frame member 7 is accomplished through means of an air cylinder 6 which is fixedly mounted to bottom frame member 13.

At each of the stations 2, 3, 4 and 5, separate activities take place. The activities of each station will now be more fully described.

Can ends enter the tester 1 through a traditional entry chute 10 formed by a plurality of rail-like members 11. A sensor 12, such as a fiber optic sensor, assures presence of ends in entry chute 10 and to entry station 2.

Ends are conveyed from station to station by means of feed bars 14. When the lower frame member 7 is in its downward-most position, the ends rest on feed bars 14. An air cylinder 16, which is controlled by solenoid valve 31 receiving input from input lines 38 and 40, actuates piston 18, moving piston 18 toward the tester stations and, through connector 20, moving feed bars 14 through the stations.

At infeed station 2, stripper knives 13, as are common in the can end conveying art, strip individual ends from the stack of ends formed by infeed 10 and move a single end to orienting station 3. At the same time, single ends are moved from station 3 to station 4, from station 4 to station 5 and from station 5 to exit chute 72, unless, of course, there are not yet ends at one or more of these stations.

Once the ends have been moved from one station to the next, air cylinder 6, which is controlled by solenoid valve 32 receiving input from lines 34 and 36, moves piston 42 upwardly, raising lower frame member 7 and closing the die stations. Once the ends have been lifted off of feed bars 14 by the lower die members of the stations, solenoid valve 31 acts to reverse air cylinder 16, moving piston 18 away from the die stations and, accordingly, pulling feed bars 14 back to the position as shown in FIG. 1.

Easy-open can ends include a finger-operable tab attached to the end and an openable panel defined by a scoreline in the end which is opened by the tab. As the ends are received at station 2 from infeed 10, these tabs are randomly positioned. However, in order to properly open and test the ends, they must be oriented identically. Station 3 accomplishes this orienting function.

After an end arrives at station 3, lower frame member 7 is again raised by air cylinder 6. The end is lifted off of feed bars 14 by die 24. Die 24 is rotably mounted by means of shaft 25 connected to motor 26. A pair of sensors 28 mounted on upper frame member 11 by means of bracket 30 look at the end. The sensors 28 may be, for example, fiber optic sensors. Each sensor looks for an edge of the tab. The end is rotated, along with die 24, by motor 26 until each of the sensors 28 sees a tab edge, when a signal is given through lines 32 to stop motor 26. At this point, the end is oriented such that the tab of the end is, as seen in FIG. 1, to the left and the panel is to the right, and its axis is along the axis of feed bar 14. At this point, lower frame member 7 is again lowered and the end returned to feed bars 14 for feeding to the next station 4.

Figure 2:
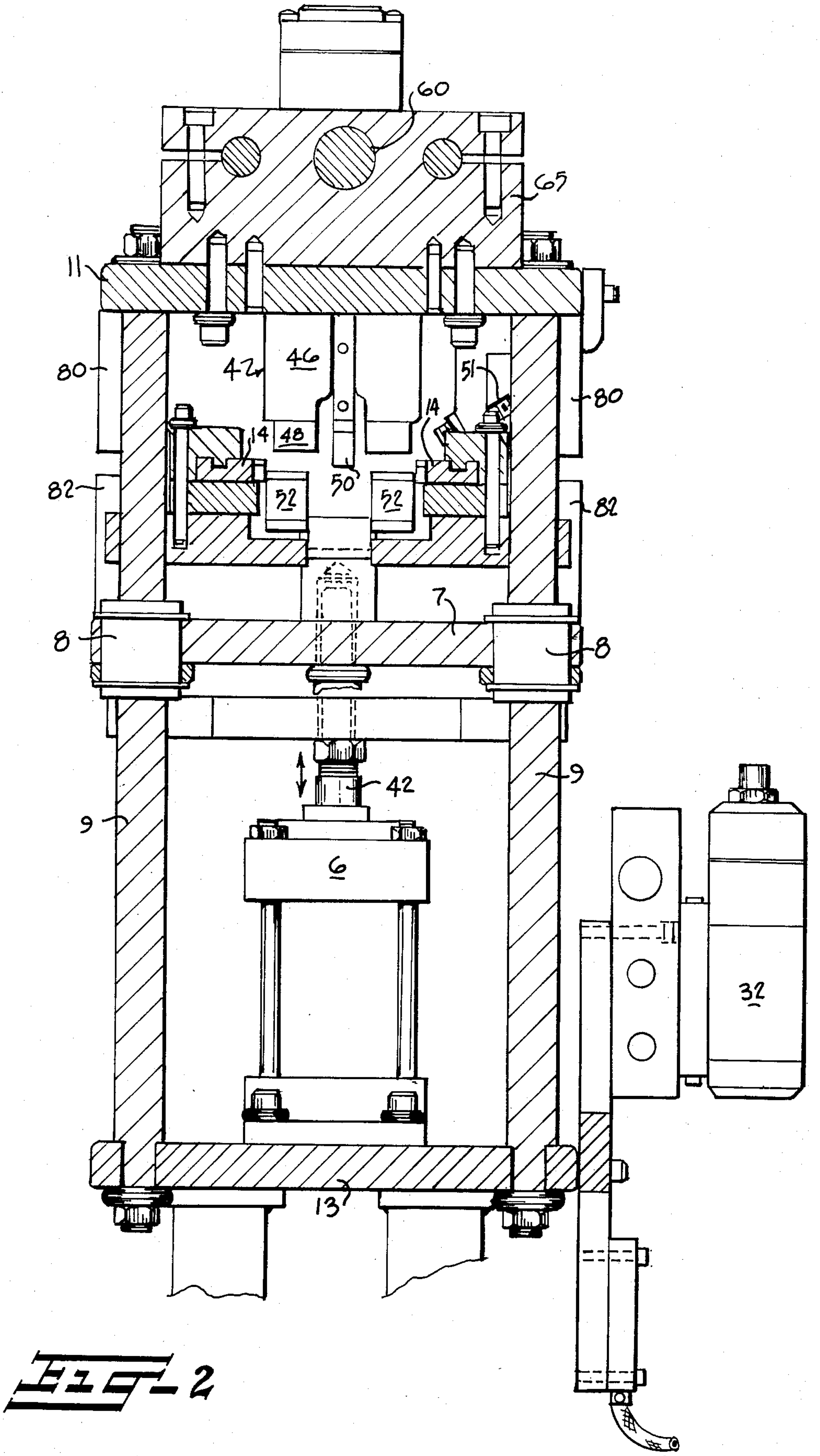
FIG. 2 is a cross-sectional view taken along line 2—2 of FIG. 1, illustrating the test station.

Station 4 is the opening and testing station. It is shown in side view in FIG. 1 and in end view in cross-sectional view 2—2 of FIG. 2. Station 4 includes upper die member 46 and lower die member 52.

As lower frame member 7 is again raised, the end is captured by lower die member 52 and held firmly between lower die member 52 and upper supporting member 48 of upper die 46. At this point, air cylinder 62, which is controlled by solenoid valve 68 receiving input signals from lines 67 and 69, pulls piston 60 toward it. Attached to piston 60 is a cam 56 mounted upon mounting means 57 and 58 for vertical sliding movement and held between brackets 63 and 65 for reciprocating horizontal movement. Attached to bracket 54 is finger 50. As piston 60 moves toward air cylinder 62, cam follower 56 follows the path of cam 57. This action is also followed by finger 50. Finger 50 is initially positioned adjacent the rearward end of the tab of the can end. As finger 50 moves toward the front of the end and upwardly, finger 50 provides opening force to the end by pulling on the tab of the end. Due to the ability to control air cylinder 62, consistent force application by finger 50 can be assured, thus eliminating human error in the testing of the can ends.

Once finger 50 has completed its opening action, transmitter 55 is activated. When the tab of the end is pulled upwardly, the opening panel of the end should move downwardly, if the end is successfully opened. The panel of a property opened end will block the signal from transmitter 55, which may be, for example, a visual signal, such as a light signal, so that no signal is received by receiver 59. Should receiver 59 receive a signal from transmitter 55, the end has not opened properly. Should this occur, any of numerous actions may be initiated by receiver 59. For example, receiver 59 could initiate an audible alarm, a light and/or a counter to determine the number of improperly opened ends. At this point, lower frame member 7 is again lowered, and the end is transferred to holding station 5 by feed bars 14.

Holding station 5 is not a required station. It is merely a holding station for the ends prior to their exit through exit chute 72. The station does permit, however, other actions to be implemented by the apparatus of the present invention, should a future need arise. At station 5, the end is held by die member 70 until a final reciprocation of feed bars 14 direct the end to exit chute 72.

Figure 3:
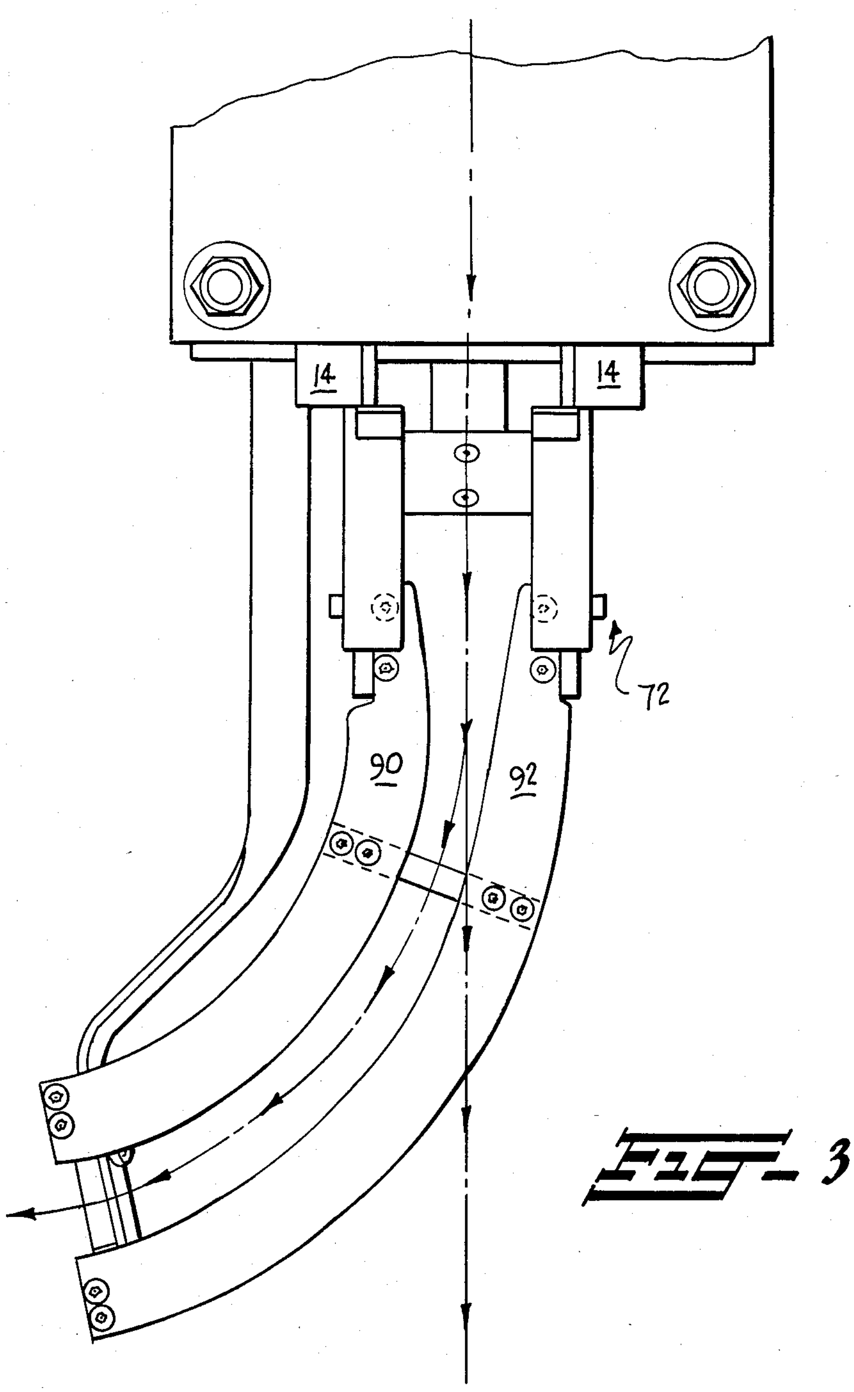
FIG. 3 is a front elevational view of the exit chute which is employed to separate satisfactory and unsatisfactory ends.

Looking at FIG. 3, exit chute 72 includes a pair of rail members 90 and 92 therein. As the ends exit feed bars 14 and enter chute 72, properly opened ends, as previously mentioned, will have an opening panel protruding beneath them. This protruding panel passes between rails 90 and 92, guiding the end to a recovery bin (not shown). If, however, the end was not properly opened, the opening panel will not protrude therebeneath, will not be held by rails 90 and 92 and will fall generally vertically downwardly to a separate storage (not shown) where these ends are isolated so that they can be more further studied.

Frame members 80 and 82 limit the vertical reciprocation of lower frame member 7, so that jamming of the apparatus will not occur. Finally, solenoid valve 84, receiving its input from lines 83 and 85, is a master solenoid control, which may act as an overall shutoff for the system.

From the foregoing, it is clear that the present invention provides a simple, yet effective means for consistently opening and testing can ends. While the invention has been described with reference to a certain specific embodiment thereof, it is not intended to be so limited thereby, except as set forth in the accompanying claims.

We claim:

1. Apparatus for testing sequentially a plurality of non-detachable easy-open beverage can ends for proper opening thereof comprising an entry station for said ends, a station for optically orienting said ends into a proper position for opening, a station for opening said ends and subsequently optically testing said ends for proper opening thereof, means for opening and closing said stations and means for transporting said ends through said stations.

2. The apparatus of claim 1 wherein said means for transporting said ends comprises a pair of feed bars and means for reciprocating said feed bars.

3. The apparatus of claim 2 wherein said means for reciprocating said feed bars comprises an air cylinder.

4. The apparatus of claim 1 wherein said entry station is connected to an entry chute for said ends.

5. The apparatus of claim 4 wherein said entry station includes stripper knives for separating an end from said ends in said entry chute.

6. The apparatus of claim 1 wherein said station for optically orienting said ends into a proper position for opening comprises a die upon which an end rests, optical means for sensing the orientation of said end on said die and means responsive to said optical means for rotating said die to orient said end on said die into a proper position for opening.

7. The apparatus of claim 6 wherein said optical means for sensing comprises a pair of fiber optic sensors.

8. The apparatus of claim 6 wherein said means responsive to said optical means for rotating comprises a motor.

9. The apparatus of claim 1 wherein said station for opening said ends and subsequently optically testing said ends comprises a first die upon which an end rests, a second die against which said end is held, a finger means for activating a tab on said end to open said end and means for subsequently optically testing said end for proper opening thereof.

10. The apparatus of claim 9 wherein said finger means comprises a finger mounted to a cam follower, a cam upon which said cam follower rides and means for reciprocating said cam follower along said cam.

11. The apparatus of claim 10 wherein said means for reciprocating comprises an air cylinder.

12. The apparatus of claim 9 wherein said means for optically testing comprises an optical sensor.

13. The apparatus of claim 9 wherein said means for optically testing is connected to means for signaling the presence of unopened ends.

14. The apparatus of claim 13 wherein said means for signaling comprises a counter.

15. The apparatus of claim 13 wherein said means for signaling comprises an alarm.

16. The apparatus of claim 13 wherein said means for signaling comprises a light.

17. The apparatus of claim 1 further comprising a station for holding said ends positioned subsequent to said station for opening and subsequently optically testing said ends.

18. The apparatus of claim 1 further comprising an exit chute positioned subsequent to said station for opening and subsequently optically testing said ends.

19. The apparatus of claim 18 wherein said exit chute includes guide rails for guiding opened ends in a first direction while permitting unopened ends to pass in a second direction.

20. The apparatus of claim 1 wherein said means for opening and closing said stations comprises an air cylinder.

* * * * *